United States Patent
Olgaard et al.

(10) Patent No.: US 9,749,066 B2
(45) Date of Patent: Aug. 29, 2017

(54) METHOD FOR TESTING A LOW POWER RADIO FREQUENCY (RF) DATA PACKET SIGNAL TRANSCEIVER

(71) Applicant: LITEPOINT CORPORATION, Sunnyvale, CA (US)

(72) Inventors: Christian Volf Olgaard, Saratoga, CA (US); Ruizu Wang, San Ramon, CA (US); Ke Liu, San Jose, CA (US); Fei Peng, Fremont, CA (US)

(73) Assignee: LitePoint Corporation, Sunnyvale, CA (US)

( * ) Notice: Subject to any disclaimer, the term of this patent is extended or adjusted under 35 U.S.C. 154(b) by 88 days.

(21) Appl. No.: 14/852,814

(22) Filed: Sep. 14, 2015

(65) Prior Publication Data
US 2017/0078031 A1    Mar. 16, 2017

(51) Int. Cl.
    *H04B 17/17*    (2015.01)
    *H04B 17/00*    (2015.01)

(52) U.S. Cl.
    CPC ......... *H04B 17/17* (2015.01); *H04B 17/0085* (2013.01)

(58) Field of Classification Search
    CPC .............................. H04B 17/17; H04W 24/06
    See application file for complete search history.

(56) References Cited

U.S. PATENT DOCUMENTS

| 8,780,966 | B1 | 7/2014 | Olgaard et al. |
| 2012/0051224 | A1 | 3/2012 | Olgaard et al. |
| 2012/0231745 | A1 | 9/2012 | Gregg et al. |
| 2014/0270211 | A1* | 9/2014 | Solum .................. H04R 25/554 381/60 |
| 2015/0036729 | A1 | 2/2015 | Olgaard et al. |
| 2015/0139023 | A1 | 5/2015 | Olgaard et al. |
| 2015/0244477 | A1 | 8/2015 | Hirst et al. |

OTHER PUBLICATIONS

Dec. 13, 2016—(WO) International Search Report & Written Opinion—App PCT/US2016/050518, 13 pages.
Bluetooth Low Energy Whitepaper; Litepoint Corporation 2012; 19 pgs.
U.S. Appl. No. 14/852,803, filed Sep. 14, 2015 titled "Method for Testing a Low Power Radio Frequency (RF) Data Packet Signal Transceiver".
U.S. Appl. No. 14/852,814, filed Sep. 14, 2015 titled "Method for Testing a Low Power Radio Frequency (RF) Data Packet Signal Transceiver".
U.S. Appl. No. 14/852,821, filed Sep. 14, 2015 titled "Method for Testing a Low Power Radio Frequency (RF) Data Packet Signal Transceiver".

* cited by examiner

*Primary Examiner* — Jae Y Lee
(74) *Attorney, Agent, or Firm* — Banner & Witcoff, Ltd.

(57) ABSTRACT

Method for testing a radio frequency (RF) data packet signal transceiver device under test (DUT) including communicating via each one of multiple available signal channels. Data packets exchanged between a tester and DUT as a normal part of a communication link initiation sequence are exchanged in such a manner that the tester transmits via all available channels simultaneously, thereby ensuring that a properly working DUT will always transmit in response. For example, in the case of a Bluetooth low energy transceiver, advertisement, scan request and scan response data packets can be used in such manner.

17 Claims, 8 Drawing Sheets

METHOD FOR TESTING A LOW POWER RADIO FREQUENCY (RF) DATA PACKET SIGNAL TRANSCEIVER

BACKGROUND

The present invention relates to testing of a low power radio frequency (RF) data packet signal transceiver, and in particular, to testing such a device using data packets exchanged between a tester and the device as a normal part of a communication link initiation sequence.

Many of today's electronic devices use wireless signal technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless signal technologies must adhere to various wireless signal technology standard specifications.

When designing such wireless devices, engineers take extra care to ensure that such devices will meet or exceed each of their included wireless signal technology prescribed standard-based specifications. Furthermore, when these devices are later being manufactured in quantity, they are tested to ensure that manufacturing defects will not cause improper operation, including their adherence to the included wireless signal technology standard-based specifications.

For testing these devices following their manufacture and assembly, current wireless device test systems typically employ testing subsystems for providing test signals to each device under test (DUT) and analyzing signals received from each DUT. Some subsystems (often referred to as "testers") include one or more vector signal generators (VSG) for providing the source, or test, signals to be transmitted to the DUT, and one or more vector signal analyzers (VSA) for analyzing signals produced by the DUT. The production of test signals by a VSG and signal analysis performed by a VSA are generally programmable (e.g., through use of an internal programmable controller or an external programmable controller such as a personal computer) so as to allow each to be used for testing a variety of devices for adherence to a variety of wireless signal technology standards with differing frequency ranges, bandwidths and signal modulation characteristics.

Testing of wireless devices typically involves testing of their receiving and transmitting subsystems. The tester will typically send a prescribed sequence of test data packet signals to a DUT, e.g., using different frequencies, power levels, and/or modulation technologies, to determine if the DUT receiving subsystem is operating properly. Similarly, the DUT will send test data packet signals at a variety of frequencies, power levels, and/or modulation technologies to determine if the DUT transmitting subsystem is operating properly.

Low power RF data packet signal transceivers often exchange data packets as a part of a sequence to initiate a communication link. One example is a personal area network (PAN) technology known as Bluetooth Low Energy (BLE, or also known as "Bluetooth Smart"), which is designed to be very conservative in its energy requirements while providing connectivity between a central device ("client") and a peripheral device ("server") once a connection is established. Examples of such devices include a "smartphone" as a central device and a pulse-rate sensor connected to a user's wrist as a peripheral device.

The original Bluetooth devices were designed to provide wireless data connections for mobile applications such as on-air headsets to cellphones and portable speakers to MP3 playback devices. The newer BLE devices are designed to be simpler and to convey data in smaller quantities and at lower speeds to minimize power use, thereby preserving battery life and enabling operation over extended periods of time.

During manufacturing, when a BLE subsystem is being tested, an input/output (I/O) port is available to facilitate conductive testing of receiver and transmitter physical-level behavior as well as DUT control. However, once the BLE subsystem is combined with the server peripheral device (e.g., a sensor), the I/O port is typically no longer available (e.g., removed or encapsulated). Hence, testing at that stage must be performed wirelessly using radiative signaling (e.g., via wireless RF signals). However, since separate DUT control is rarely available (e.g., neither a conductive signal path nor a wireless control signal channel is available), such testing relies upon establishing a wireless communication link between a tester and the BLE-based peripheral device-under-test (DUT), with DUT control established by including driver software within the DUT and DUT-specific testing software within the tester. Such requirements for driver and testing software increase testing complexity and time and thereby increase testing costs.

Additionally, continuing with the BLE example, the data packets used by a peripheral device to initiate a communication link can be transmitted on any of multiple (e.g., three) channels in random order. Unless a testing system knows in advance on which channel the DUT will transmit, it cannot deterministically transmit a responsive data packet on that same channel. This can significantly delay test time, or require some form of predetermined coding to be employed within the DUT, which would negate the use of a generalized testing methodology.

Further with the BLE example, pending establishment of a communication link, a relatively long time interval exists between data packet sequences seeking to initiate a communication link. Meanwhile, during the link initiation sequence, initiating data packets are transmitted on the multiple prescribed channels in rapid succession. It would be advantageous if such rapid sequence of data packets could be used for testing, and thereby derive more test data, faster, and reduce overall test time.

SUMMARY

In accordance with the presently claimed invention, a method is provided for testing a radio frequency (RF) data packet signal transceiver device under test (DUT) including communicating via each one of multiple available signal channels. Data packets exchanged between a tester and DUT as a normal part of a communication link initiation sequence are exchanged in such a manner that the tester transmits via all available channels simultaneously, thereby ensuring that a properly working DUT will always transmit in response. For example, in the case of a Bluetooth low energy transceiver, advertisement, scan request and scan response data packets can be used in such manner.

In accordance with one embodiment of the presently claimed invention, a method for testing a radio frequency (RF) data packet signal transceiver device under test (DUT) including communicating via each one of a plurality of signal channels, includes:

receiving, with a tester via one of the plurality of signal channels, a link initiation data packet from the DUT;

transmitting, with the tester via each one of the plurality of signal channels simultaneously, a tester response data packet responsive to the link initiation data packet; and receiving, with the tester via the one of the plurality of signal channels, a DUT response data packet responsive to the tester response data packet.

In accordance with another embodiment of the presently claimed invention, a method for testing a radio frequency (RF) data packet signal transceiver device under test (DUT) including communicating via each one of a plurality of signal channels, includes:

transmitting, with the DUT via one of the plurality of signal channels, a link initiation data packet;

receiving, with the DUT via each one of the plurality of signal channels simultaneously, a tester response data packet responsive to the link initiation data packet; and transmitting, with the DUT via the one of the plurality of signal channels, a DUT response data packet responsive to the tester response data packet.

In accordance with another embodiment of the presently claimed invention, a method for testing a radio frequency (RF) data packet signal transceiver device under test (DUT) including communicating via each one of a plurality of signal channels, includes:

transmitting, with the DUT via one of the plurality of signal channels, a link initiation data packet;

receiving, with a tester, the link initiation data packet and in response thereto transmitting, via each one of the plurality of signal channels simultaneously, a tester response data packet;

receiving, with the DUT via each one of the plurality of signal channels simultaneously, the tester response data packet and in response thereto transmitting, via the one of the plurality of signal channels, a DUT response data packet; and receiving, with the tester via the one of the plurality of signal channels, the DUT response data packet.

DETAILED DESCRIPTION

Figure 1:
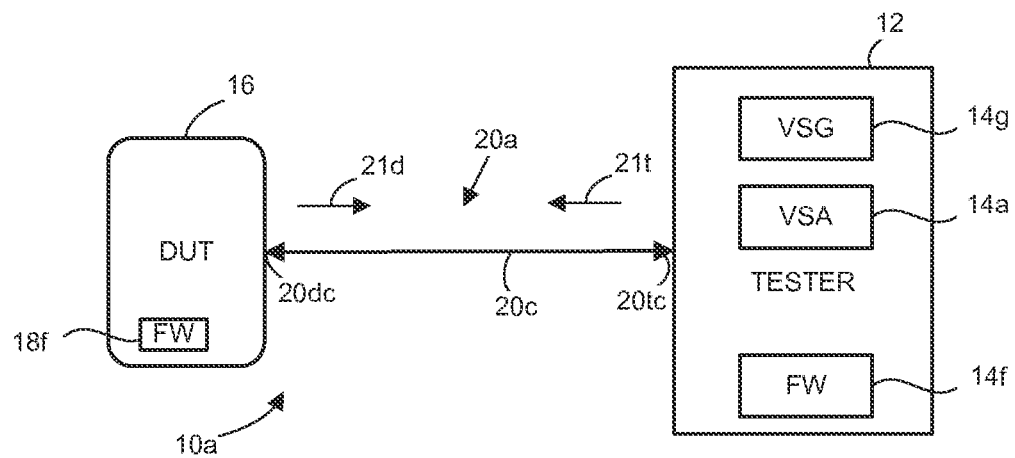
FIG. 1 depicts a typical testing environment for a radio frequency (RF) data packet signal transceiver device under test (DUT) in a conductive, or wired, environment.

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

Wireless devices, such as cellphones, smartphones, tablets, etc., make use of standards-based technologies (e.g., IEEE 802.11a/b/g/n/ac, 3GPP LTE, and Bluetooth). The standards that underlie these technologies are designed to provide reliable wireless connectivity and/or communications. The standards prescribe physical and higher-level specifications generally designed to be energy-efficient and to minimize interference among devices using the same or other technologies that are adjacent to or share the wireless spectrum.

Tests prescribed by these standards are meant to ensure that such devices are designed to conform to the standard-prescribed specifications, and that manufactured devices continue to conform to those prescribed specifications. Most devices are transceivers, containing at least one or more receivers and transmitters. Thus, the tests are intended to confirm whether the receivers and transmitters both conform. Tests of the receiver or receivers (RX tests) of a DUT typically involve a test system (tester) sending test packets to the receiver(s) and some way of determining how the DUT receiver(s) respond to those test packets. Transmitters of a DUT are tested by having them send packets to the test system, which then evaluates the physical characteristics of the signals sent by the DUT.

Referring to FIG. 1, a typical manufacturing test environment 10a includes a tester 12 and a DUT 16, with test data packet signals 21t and DUT data packet signals 21d exchanged as RF signals conveyed between the tester 12 and DUT 16 via a conductive signal path, typically in the form of co-axial RF cable 20c and RF signal connectors 20tc, 20dc. As noted above, the tester typically includes a signal source 14g (e.g., a VSG) and a signal analyzer 14a (e.g., a VSA). Also, as discussed above, the tester 12 and DUT 16 include preloaded information regarding predetermined test sequences, typically embodied in firmware 14f within the tester 12 and firmware 18f within the DUT 16. As further noted above, the details within this firmware 14f, 18f about the predetermined test flows typically requires some form of explicit synchronization between the tester 12 and DUT 16, typically via the data packet signals 21t, 21d.

Figure 2:
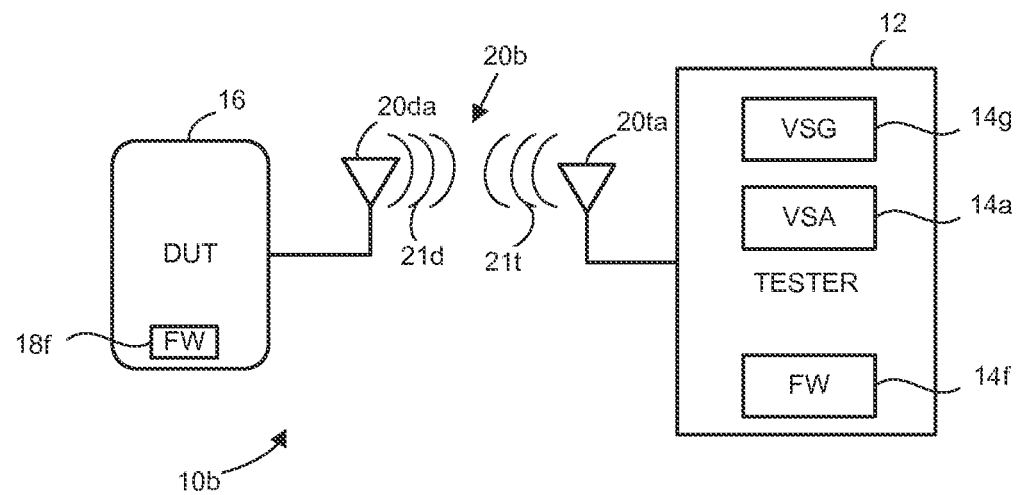
FIG. 2 depicts a typical testing environment for a RF DUT in a radiative, or wireless, environment.

Referring to FIG. 2, a typical test environment 10b following final assembly (after which, as noted above, a physical DUT signal connection 20dc is generally unavailable) uses a wireless signal path 20b via which the test data packet signals 21t and DUT data packet signals 21d are communicated via respective antenna systems 20ta, 20da of the tester 12 and DUT 16.

The following discussion is presented in the context of a BLE device as the DUT. However, it will be readily appreciated by one of ordinary skill in the art that the principles and operation of the presently claimed invention are also applicable to devices or systems in which data packets are exchanged as a normal part of a communication link initiation sequence. As is known and discussed below, in the case of a BLE transceiver, such data packets are in the form of advertisement, scan request and scan response data packets.

Figure 3:
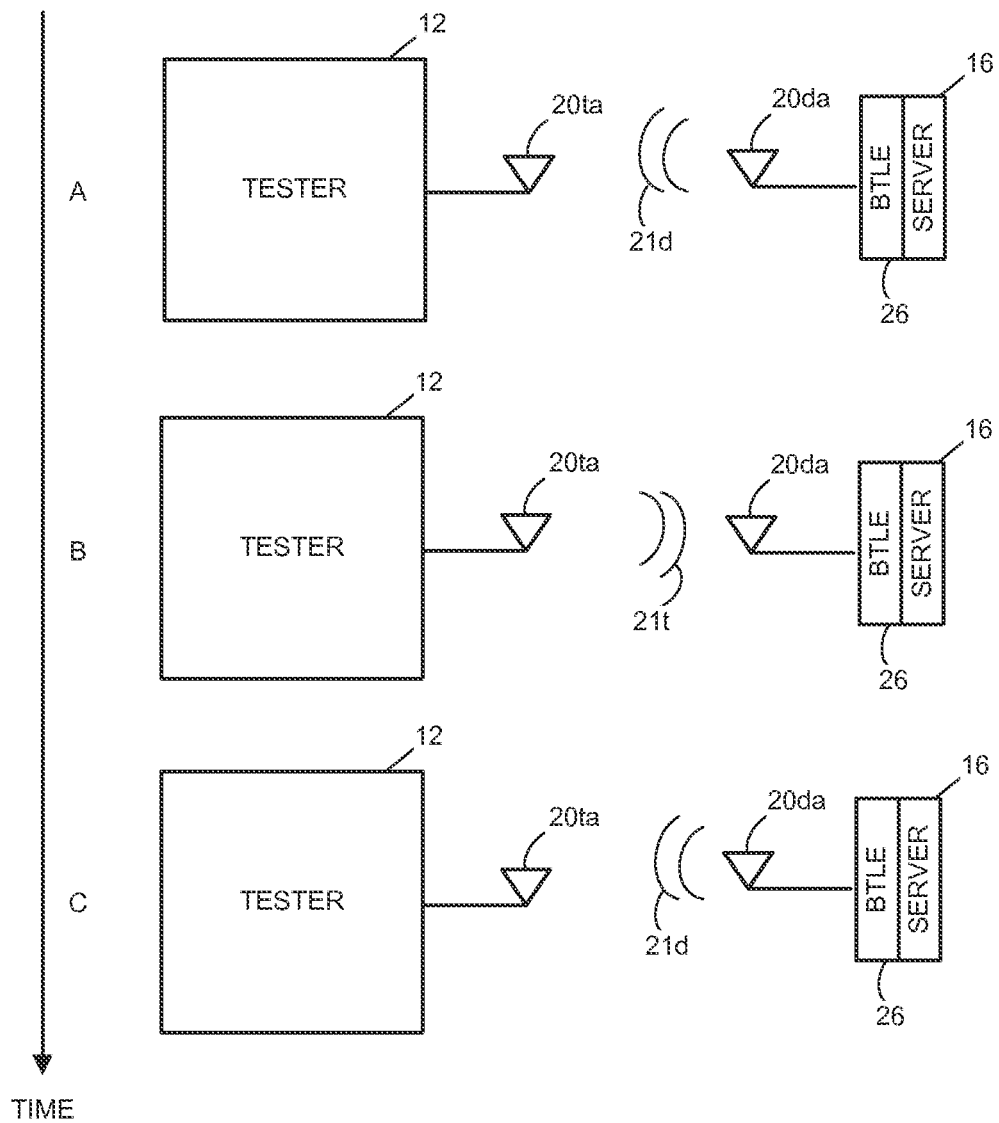
FIG. 3 depicts a testing environment for a RF DUT in a wireless environment in accordance with exemplary embodiments of the presently claimed invention.

Referring to FIG. 3, testing methods in accordance with the presently claimed invention for devices or systems that exchange data packets as a normal part of a communication link initiation sequence, such as BLE devices and systems, are typically performed in a wireless testing environment. The DUT 16 includes a BLE subsystem or device 26 which transmits 21d advertisement packets for reception by the tester 12 (stage A). Following successful reception by the tester 12 of an advertisement packet, the tester 12 transmits 21t a scan request packet (stage B). Following successful reception by the BLE subsystem 26 of the DUT 16, the DUT 16 transmits 21d a scan response packet (stage C).

These exchanges of such packets are prescribed within the signal standard for BLE systems. Accordingly, the DUT 16 does not require any special driver code (e.g., in either firmware or software form) nor does the tester 12 require any device-specific or otherwise or testing software or firmware. Also, this interchange of packets occurs prior to and in the absence of a communication link having already been established between the DUT 16 and tester 12. Accordingly, no communication profile is yet active and any BLE device can be prompted to interact with a tester in this way.

Figure 4:
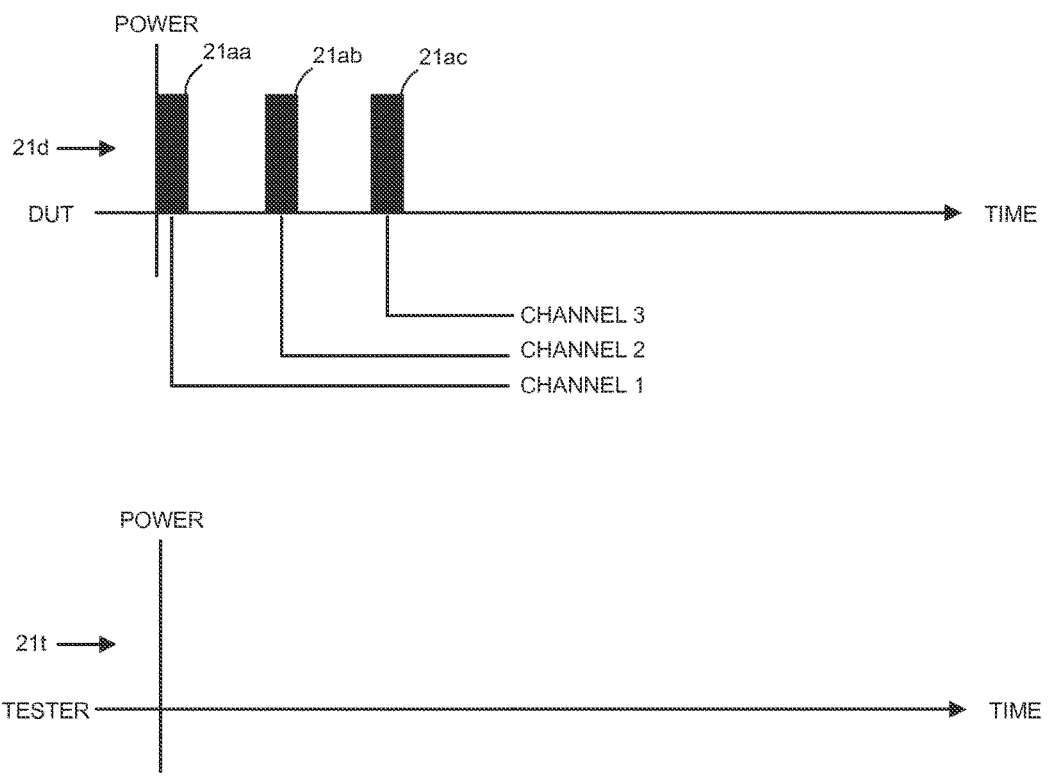
FIG. 4 depicts transmission of advertisement packets by a BLE DUT with no tester response.

Referring to FIG. 4, in accordance with the BLE signal standard, a BLE device uses three channels (among 40 channels total) for device discovery and connection setup. These channels are located between the standard wireless local area network channels ("Wi-Fi") to minimize inter-system interference. These channels are known as "advertising" channels and are used by the BLE system to search for other devices or promote its own presence to devices that might be looking to make a connection. The device transmits an advertisement packet, and then waits for a prescribed time interval to receive a scan request packet. If no scan request packet is received within that time interval, another advertisement packet on a different channel is transmitted. Initial channel selection is random, and each subsequent advertisement packet is transmitted on a different channel, until all three channels have been used, following which this process repeats until a scan request packet is received and a communication link is established.

Accordingly, as shown by way of example here, the BLE device transmits a first advertisement packet 21aa on a randomly chosen channel, e.g., channel 1. If no scan request packet is received in response, a second advertisement packet 21ab is transmitted on another channel, e.g., channel 2. Again, if no scan request packet is received within the prescribed time interval, a third advertisement packet 21ac is transmitted on the remaining channel, e.g., channel 3.

Figure 5:
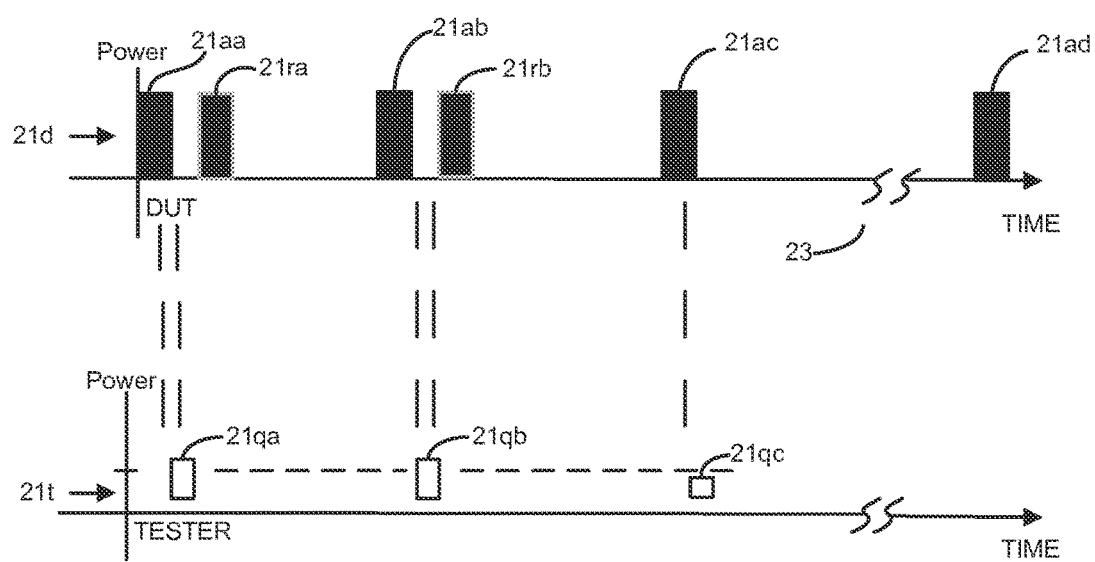
FIG. 5 depicts exchanges of advertisement, scan request and scan response packets between a BLE DUT and tester in accordance with exemplary embodiments.

Referring to FIG. 5, in accordance with exemplary embodiments, the DUT transmits an advertisement packet 21aa, which is correctly received by the tester, and in response to which the tester transmits a scan request packet 21qa. Responsive to successful reception of this scan request packet 21qa, the DUT then transmits a scan response packet 21ra. These packets 21aa, 21qa, 21ra are all transmitted on the same channel (channel 1, 2 or 3). If the tester refrains from sending any further packets after the scan response packet 21ra, the DUT will wait for a prescribed time interval for reception of further commands. If no further commands are received within that time interval, the DUT resumes sending advertisement packets 21ab, 21ac, 21ad at successive specified advertisement intervals on respective ones of the three advertisement channels in close-order succession.

Hence, for example as shown here, the DUT transmits a second advertisement packet 21ab, receives a scan request packet 21qb and responds with a scan response packet 21rb. However, when the DUT sends a third advertisement packet 21ac, the tester in this example transmits scan request packet 21qc with a reduced signal power, which fails to be received by the DUT. Accordingly, the DUT transmits no scan response packet. Then, after the prescribed time interval 23, the DUT again resumes operation by sending a fourth advertisement packet 21ad.

As can be seen by this operation, a tester can use the BLE standard protocol to elicit from a DUT one or more scan response packets at one of the three prescribed advertisement packet frequencies. Such scan response packets transmitted by the DUT can be viewed as analogous to "acknowledgement" (ACK) packets used in Wi-Fi systems (as per the IEE 802.11 standard), which can be used to test Wi-Fi transmitter signal characteristics (e.g., signal power levels and data encoding). Similarly, in this context, the tester here can use these scan response packets to determine how many scan request packets transmitted by the tester were received by the DUT. The ratio of received scan response packets to transmitted scan requests packets can be used to derive an effective packet error rate (PER).

Further, by varying the power level of the scan request packet transmitted by the tester, variations in the number of scan response packets received will result, and can be used to determine sensitivity of the BLE receiver within the DUT, similar to performing PER testing of a Wi-Fi receiver, as described in U.S. patent application Ser. No. 13/959,354 filed on Aug. 5, 2013, and published as U.S. Pat. Pub. 2015/0036729, the disclosure of which is incorporated herein by reference. Hence, the tester can obtain useful information about the DUT receiver sensitivity within a short test time. Further, the tester may analyze signal qualities of the scan response packets, as well as the advertisement packets, such as frequency, power level, modulation, etc., to determine the quality of performance by the DUT transmitter.

In any event, these tests can be conducted using a conventional tester, e.g., with conventional VSA and VSG systems, without need for special driver code within the DUT or device-specific testing software for the tester.

Figure 6:
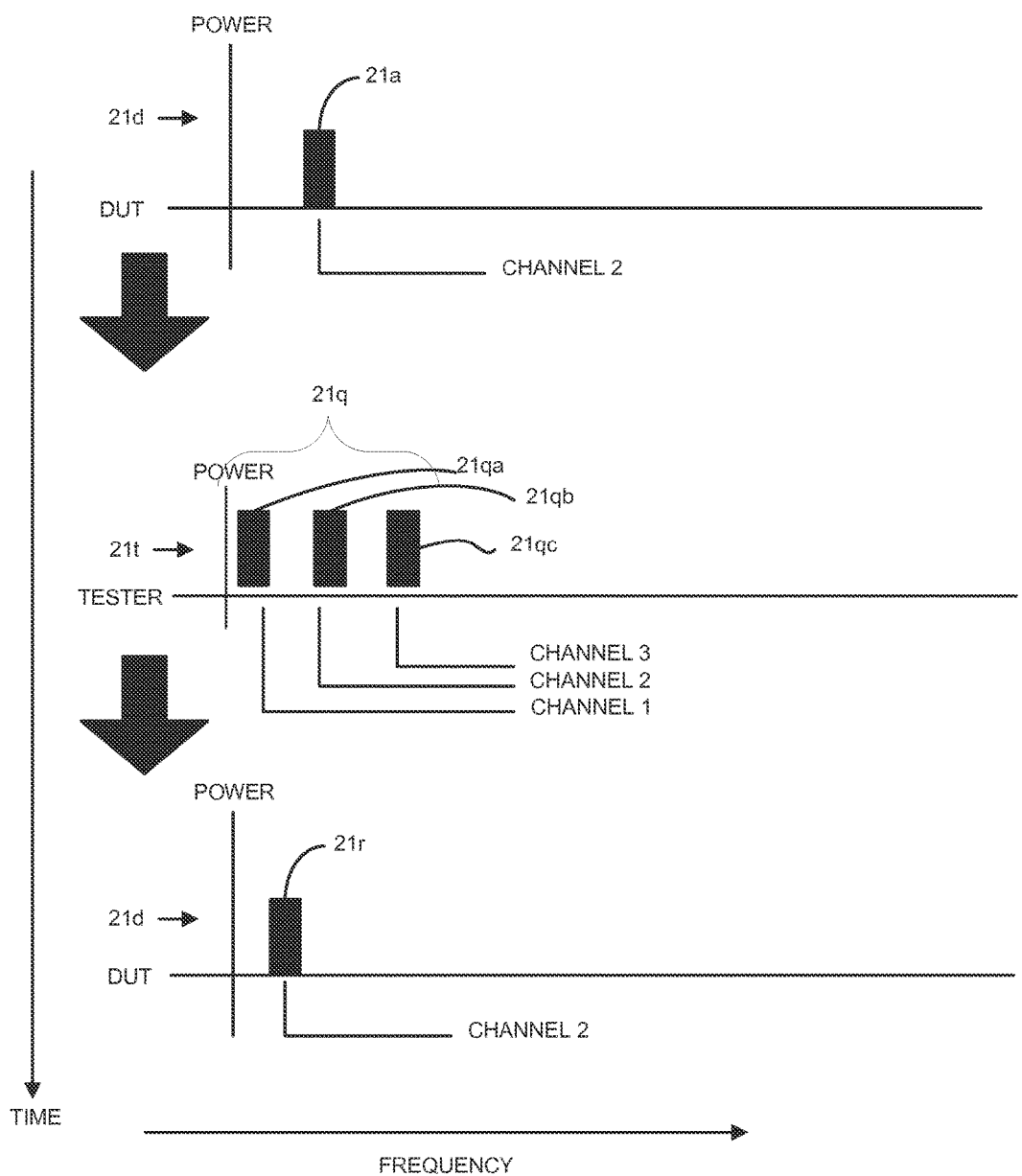
FIGS. 6 and 7 depict exchanges of advertisement, scan request and scan response packets between a BLE DUT and tester transmitting multiple scan request packets simultaneously in accordance with exemplary embodiments.

Referring to FIG. 6, in accordance with further exemplary embodiments, testing can be simplified and expedited using a broadband transmitter within the tester (e.g., a broadband VSG), thereby avoiding a need for the receiver within the tester (e.g., a VSA) to quickly determine the channel on which the DUT is transmitting its advertisement packet. For example, in response to receiving the advertisement packet 21a from the DUT, e.g., on channel 2, the tester transmits a group 21q of scan request packets 21qa, 21qb, 21qc, with each scan request packet 21qa, 21qb, 21qc transmitted on a respective one of the three advertisement packet channels using the broadband transmitter capability. As a result, the DUT will receive a response scan request packet on all three advertisement channels (i.e., the channel actually used for the advertisement packet 21a as well as the other two channels not used), thereby ensuring that the DUT, in turn, responds by transmitting a scan response packet 21r on the same channel on which the original advertisement packet 21a was transmitted.

Figure 7:
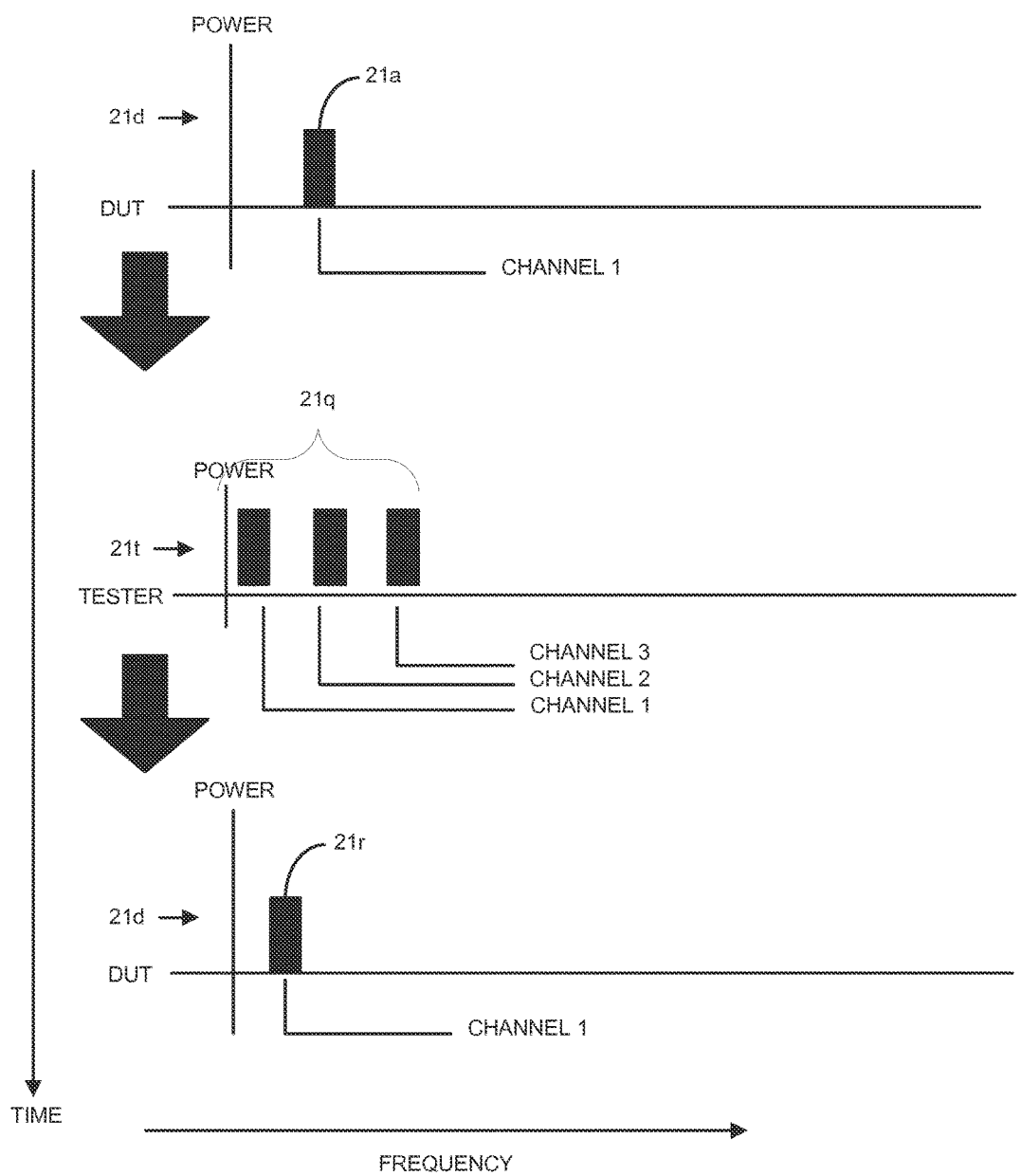

Referring to FIG. 7, this technique of responding to advertisement packets with scan request packets on all channels ensures that regardless of which channel on which the DUT transmits the initial advertisement packet 21a, in this case on channel 1, the DUT will receive, in response, a scan request packet on the same channel (as well as on the unused channels). As a result, the DUT will then complete the communication link initiation sequence by responding, in turn, with a scan response packet 21r on the same channel. Hence, regardless of which of the three prescribed channels is used by the DUT to transmits its initial advertisement packet 21a, the tester, by responding with a scan request packet on all available advertisement channels, will be able to elicit a scan response packet 21r from the DUT, so long as the DUT is performing properly and the scan request packet 21q power is sufficient to be received correctly by the DUT.

In a related manner, the tester can employ a wideband receiver (e.g., VSA) to detect and correctly receive the advertisement 21a and scan response 21r packets. Even if such receiver is unable to determine, in real time, the channel over which the interactions are occurring, the received packets, once captured, can be used later, e.g., with downstream systems or processing, to determine the channel during post-capture processing.

In those instances where signal path loss varies with the advertisement channel frequency, the transmitted packet power can be varied with an offset that is sufficient to ensure that the received signal power at the DUT is sufficient for each of the three advertisement channels.

Figure 8:
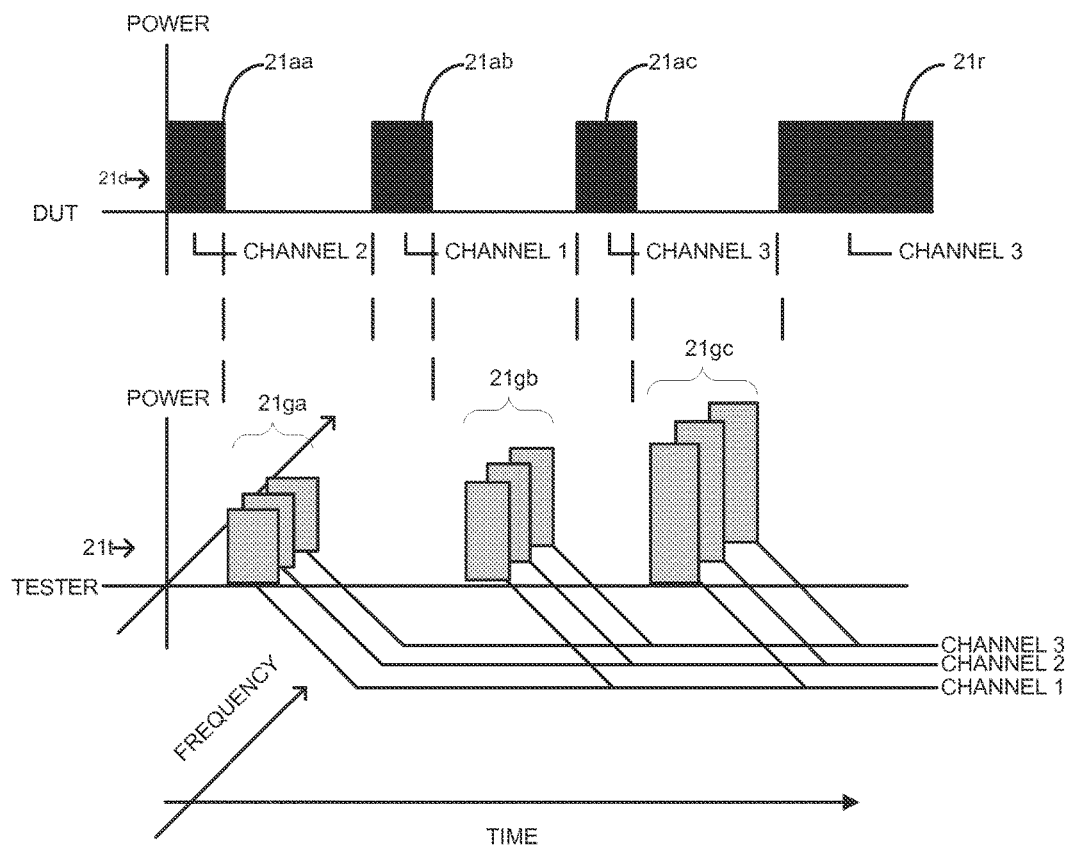
FIGS. 8 and 9 depict exchanges of advertisement, scan request and scan response packets between a BLE DUT and tester transmitting multiple scan request packets simultaneously with varying power levels in accordance with exemplary embodiments.

Referring to FIG. 8, in accordance with further exemplary embodiments, the techniques discussed above of transmitting scan request packets at varied signal powers and transmitting multiple scan request packets simultaneously via different channels can be used in combination(s). For example, responsive to a first advertisement packet 21aa (e.g., on channel 2), the tester can transmit scan request packets on all channels simultaneously, as discussed above, at a reduced power level intended to prevent successful reception by the DUT. As a result, the DUT, after the prescribed time interval, transmits a second advertisement packet 21ab on a different channel (e.g., on channel 1). The tester detects this advertisement packet 21ab and responds by transmitting a second set of scan request packets 21qb on all channels simultaneously, this time at a higher power level. However, this higher power level is still insufficient to ensure successful reception by the DUT. Accordingly, the DUT, again after the prescribed time interval, transmits a third advertisement packet 21ac on another different channel (e.g., on the remaining channel 3), in response to which the tester transmits a third set 21qc of scan request packets, this time at a still higher power level. This power level is now sufficient to ensure successful reception by the DUT, which responds with a scan response packet 21r on the same channel (e.g., channel 3) as used for the most recent exchange of advertisement packet 21ac and scan request packets 21qc.

Consequently, three different power levels for the scan request packets are used for testing the ability of the DUT receiver to successfully receive such scan request packets. While the first two sets 21qa, 21qb of scan request packets were too low in power, the third set 21qc was of sufficient power to elicit a scan response packet 21r. Accordingly, this test can effectively yield three results from a single operation. Since noise adds to this system and cannot be entirely prevented, it cannot be concluded as to what actual power level constitutes a threshold above which the DUT will be ensured to successfully receive all scan request packets. Further statistical results will be needed to determine this. Accordingly, multiple test like this can be performed to determine a statistical distribution that identifies or is otherwise indicative of such threshold.

Figure 9:
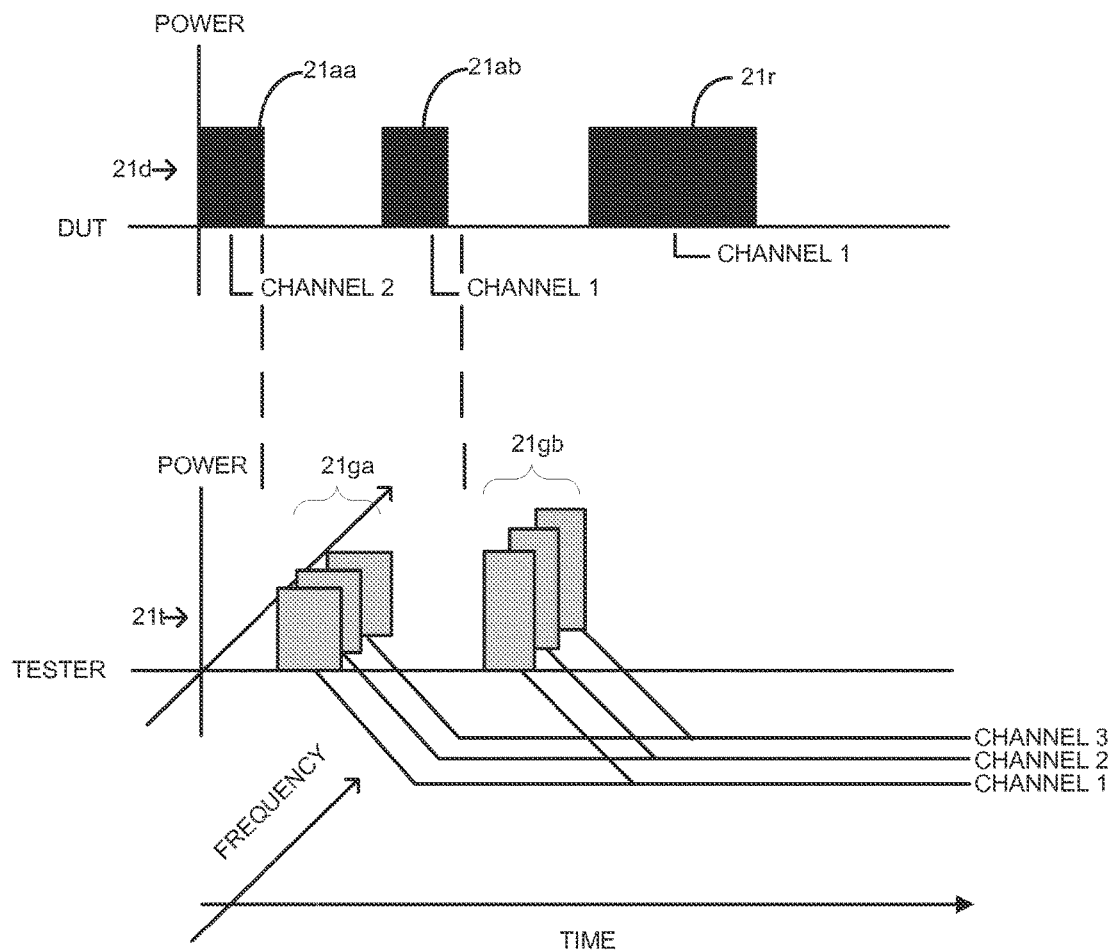

Referring to FIG. 9, as part of arriving at such a statistical distribution, the scan request packets sets 21qa, 21qb can be transmitted with power levels such that only two power levels are needed to elicit a scan response packet. For example, while the first set 21qa of scan request packets has a power level insufficient to ensure successful reception by the DUT, the second set 21qb can be transmitted with a power level between the power levels of the second and third sets of scan request packets as identified in the previous example (FIG. 8). This can advantageously further reduce the time between test results, e.g., if a connection request is received, since the time between sequential advertisement packets is significantly shorter than the time between the onset of a new advertisement packet sequence in the absence of an established communication link. (However, in some instances a third advertisement packet may still be transmitted, e.g., if there is no event following a scan response packet, in which case three test results would still be obtained.)

In any event, performing these packet exchanges with varying power levels enables formation of a statistical database. Further, by properly choosing the varied packet power levels it is possible to more quickly converge on the statistical power level at which half of the scan request packets are received correctly and elicit corresponding scan response packets. According, if the power levels chosen are all below this sensitivity point, the DUT will send subsequent advertisement packets in quick succession. This enables the setting of new values for the power level when sending the scan request packet without having to wait over the longer duration before a new advertisement packet sequence is initiated.

Various other modifications and alterations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method for testing a radio frequency (RF) data packet signal transceiver device under test (DUT) including communicating via each one of a plurality of signal channels, comprising:

receiving, with a tester via one of said plurality of signal channels, a link initiation data packet from said DUT;

transmitting, with said tester via each one of said plurality of signal channels simultaneously, a tester response data packet responsive to said link initiation data packet; and receiving, with said tester via said one of said plurality of signal channels, a DUT response data packet responsive to said tester response data packet.

2. The method of claim 1, wherein said DUT response data packet is responsive to said tester response data packet transmitted with said tester via said one of said plurality of signal channels.

3. The method of claim 1, wherein:
said DUT comprises a Bluetooth low energy device;
said link initiation data packet comprises an advertisement data packet;
said tester response data packet comprises a scan request data packet; and
said DUT response data packet comprises a scan response data packet.

4. The method of claim 1, further comprising:
receiving, with said tester via another one of said plurality of signal channels, another link initiation data packet from said DUT;
transmitting, with said tester via each one of said plurality of signal channels simultaneously, another tester response data packet responsive to said another link initiation data packet; and
receiving, with said tester via said another one of said plurality of signal channels, another DUT response data packet responsive to said another tester response data packet.

5. The method of claim 4, wherein said another DUT response data packet is responsive to said another tester response data packet transmitted with said tester via said another one of said plurality of signal channels.

6. The method of claim 1, wherein said DUT response data packet includes a plurality of signal characteristics, and further comprising analyzing, with said tester, at least one of said plurality of signal characteristics.

7. A method for testing a radio frequency (RF) data packet signal transceiver device under test (DUT) including communicating via each one of a plurality of signal channels, comprising:
transmitting, with said DUT via one of said plurality of signal channels, a link initiation data packet;
receiving, with said DUT via each one of said plurality of signal channels simultaneously, a tester response data packet responsive to said link initiation data packet; and
transmitting, with said DUT via said one of said plurality of signal channels, a DUT response data packet responsive to said tester response data packet.

8. The method of claim 7, wherein said DUT response data packet is responsive to said tester response data packet received with said DUT via said one of said plurality of signal channels.

9. The method of claim 7, wherein:
said DUT comprises a Bluetooth low energy device;
said link initiation data packet comprises an advertisement data packet;
said tester response data packet comprises a scan request data packet; and
said DUT response data packet comprises a scan response data packet.

10. The method of claim 7, further comprising:
transmitting, with said DUT via another one of said plurality of signal channels, another link initiation data packet;
receiving, with said DUT via each one of said plurality of signal channels simultaneously, another tester response data packet responsive to said another link initiation data packet; and
transmitting, with said DUT via said another one of said plurality of signal channels, another DUT response data packet responsive to said another tester response data packet.

11. The method of claim 10, wherein said another DUT response data packet is responsive to said another tester response data packet transmitted with said tester via said another one of said plurality of signal channels.

12. A method for testing a radio frequency (RF) data packet signal transceiver device under test (DUT) including communicating via each one of a plurality of signal channels, comprising:
transmitting, with said DUT via one of said plurality of signal channels, a link initiation data packet;
receiving, with a tester, said link initiation data packet and in response thereto transmitting, via each one of said plurality of signal channels simultaneously, a tester response data packet;
receiving, with said DUT via each one of said plurality of signal channels simultaneously, said tester response data packet and in response thereto transmitting, via said one of said plurality of signal channels, a DUT response data packet; and
receiving, with said tester via said one of said plurality of signal channels, said DUT response data packet.

13. The method of claim 12, wherein said DUT response data packet is responsive to said tester response data packet transmitted with said tester via said one of said plurality of signal channels.

14. The method of claim 12, wherein:
said DUT comprises a Bluetooth low energy device;
said link initiation data packet comprises an advertisement data packet;
said tester response data packet comprises a scan request data packet; and
said DUT response data packet comprises a scan response data packet.

15. The method of claim 12, further comprising:
transmitting, with said DUT via another one of said plurality of signal channels, another link initiation data packet;
receiving, with said tester, said another link initiation data packet and in response thereto transmitting, via each one of said plurality of signal channels simultaneously, another tester response data packet;
receiving, with said DUT via each one of said plurality of signal channels simultaneously, said another tester response data packet and in response thereto transmitting, via said another one of said plurality of signal channels, another DUT response data packet; and
receiving, with said tester via said another one of said plurality of signal channels, said another DUT response data packet.

16. The method of claim 15, wherein said another DUT response data packet is responsive to said another tester response data packet transmitted with said tester via said another one of said plurality of signal channels.

17. The method of claim 12, wherein said DUT response data packet includes a plurality of signal characteristics, and further comprising analyzing, with said tester, at least one of said plurality of signal characteristics.

\* \* \* \* \*